(No Model.)

J. H. KEEDY.
FORCE FEED FOR GRAIN DRILLS.

No. 298,390. Patented May 13, 1884.

WITNESSES
F. L. Ourand
E. G. Siggers

John H. Keedy
INVENTOR
by C. A. Snow & Co
Attorney

# UNITED STATES PATENT OFFICE.

JOHN H. KEEDY, OF WEST ALEXANDRIA, OHIO.

FORCE-FEED FOR GRAIN-DRILLS.

SPECIFICATION forming part of Letters Patent No. 298,390, dated May 13, 1884.

Application filed February 12, 1884. (No model.)

*To all whom it may concern:*

Be it known that I, JOHN H. KEEDY, a citizen of the United States, residing at West Alexandria, in the county of Preble and State of Ohio, have invented a new and useful Force-Feed for Grain-Drills, of which the following is a specification, reference being had to the accompanying drawings.

This invention has relation to force-feeds for grain-drills; and it consists in the novel construction and arrangement of parts, as will be hereinafter fully described, and particularly pointed out in the claim appended.

Figure 1:
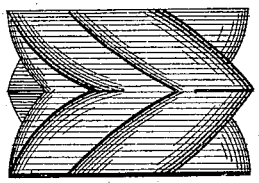
Figure 2:
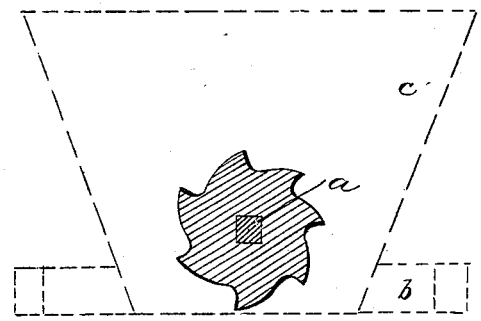
Figure 3:
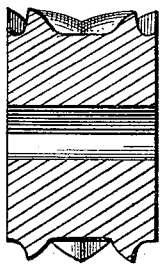

Figure 1 is a plan view of a feed-wheel embodying my improvements. Fig. 2 is a vertical sectional view of the feed-wheel in place in the hopper, and Fig. 3 is a transverse sectional view of the wheel.

Referring by letter to the accompanying drawings, *a* designates the shaft, rectangular in form, on which my improved wheel is secured.

The feed-wheel is distinctive from others in this, that it is provided on its periphery with arrow-shaped grooves and alternating arrow-head ribs, and the shaft rotates the wheel in the direction of the arrow-points. This construction permits short straws and the like to pass through with the grain being sown without interfering with the proper distribution of the same.

*b* designates the frame; *c*, the hopper.

Heretofore in force-feeds of this class the feed-wheels have been provided with V-shaped grooves in their perimeters; but the feed-wheels have been revolved with the bases of the grooves presented forward, which has the effect of crowding the grain to the center of the wheel and to discharge it from the central line of the wheel. This arrangement I find in practice to be objectionable, as there is too great a concentration of the grain, and it does not feed with uniformity. By my arrangement the feed-wheel is revolved with the points of the arrows advancing first, which has the effect of spreading the grain the entire width of the feed-wheel, and produces an even and uniform distribution of the grain to the discharge-tubes.

This device is cheap, simple in construction, and is positive in its action. It will not clog, and will distribute the grain evenly.

Having thus fully described my invention, what I claim as new, and desire to secure by Letters Patent of the United States, is—

In a force-feed grain-drill, a feed-wheel having on its periphery a series of arrow-head ribs and alternating arrow-head-shaped depressions, and arranged upon the shaft, as described, to rotate in the direction of the arrow-points, substantially as specified.

In testimony that I claim the foregoing as my own I have hereto affixed my signature in presence of two witnesses.

JOHN H. KEEDY.

Witnesses:
   JAMES CAMPBELL,
   J. McLEAN.